(12) United States Patent
Lee et al.

(10) Patent No.: US 11,553,417 B2
(45) Date of Patent: Jan. 10, 2023

(54) PDCCH MONITORING AFTER DRX CONFIGURATION OR RECONFIGURATION

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 285 days.

(21) Appl. No.: 16/336,414

(22) PCT Filed: Sep. 28, 2017

(86) PCT No.: PCT/KR2017/010791
§ 371 (c)(1),
(2) Date: Mar. 25, 2019

(87) PCT Pub. No.: WO2018/062886
PCT Pub. Date: Apr. 5, 2018

(65) Prior Publication Data
US 2019/0239160 A1 Aug. 1, 2019

Related U.S. Application Data

(60) Provisional application No. 62/401,928, filed on Sep. 30, 2016.

(51) Int. Cl.
*H04W 52/02* (2009.01)
*H04W 76/28* (2018.01)
*H04W 72/12* (2009.01)

(52) U.S. Cl.
CPC ... *H04W 52/0216* (2013.01); *H04W 72/1284* (2013.01); *H04W 76/28* (2018.02)

(58) Field of Classification Search
CPC ............. H04W 52/0216; H04W 76/28; H04W 72/1284
See application file for complete search history.

(56) References Cited

U.S. PATENT DOCUMENTS 8,743,859 B2 * 6/2014 Lee ........................ H04W 76/28
370/345
2008/0101268 A1 5/2008 Sammour et al.
(Continued)

FOREIGN PATENT DOCUMENTS

CN 101584191 A 11/2009
CN 102217404 A 10/2011
(Continued)

OTHER PUBLICATIONS

Search Report of European Patent Office in Appl'n. No. 17856772.3, dated May 12, 2020.
(Continued)

*Primary Examiner* — Huy D Vu
*Assistant Examiner* — Bailor C Hsu
(74) *Attorney, Agent, or Firm* — Dentons US LLP

(57) ABSTRACT

A method and apparatus for a user equipment (UE) operating based on a DRX (Discontinuous Reception) configuration are disclosed. According to these, the UE receives a message including configuration or reconfiguration of DRX; and monitors a PDCCH (Physical Downlink Control Channel) during an active time according to the configuration or reconfiguration of DRX. Here, the active time includes a time period during a PDCCH indicating a new transmission has not been received after receiving the message including configuration or reconfiguration of DRX.

10 Claims, 3 Drawing Sheets

(56) References Cited

U.S. PATENT DOCUMENTS

| | | |
|---|---|---|
| 2009/0247203 A1 | 10/2009 | Kuo |
| 2010/0322173 A1* | 12/2010 | Marinier ................. H04L 5/001 370/329 |
| 2011/0059745 A1* | 3/2011 | Yi ......................... H04W 24/08 455/452.2 |
| 2011/0199910 A1 | 8/2011 | Oh et al. |
| 2011/0237266 A1* | 9/2011 | Cai ....................... H04W 76/28 455/450 |
| 2011/0243047 A1* | 10/2011 | Dayal ................... H04W 16/14 370/329 |
| 2011/0294491 A1* | 12/2011 | Fong ....................... H04L 5/001 455/422.1 |
| 2012/0082140 A1* | 4/2012 | Lin ..................... H04W 74/085 370/336 |
| 2012/0176950 A1* | 7/2012 | Zhang ................... H04L 5/0098 370/311 |
| 2012/0178445 A1* | 7/2012 | Dalsgaard ............. H04W 72/02 455/434 |
| 2012/0327833 A1* | 12/2012 | Kim .................. H04W 52/0235 370/311 |
| 2013/0163533 A1* | 6/2013 | Anderson ............. H04W 72/04 370/329 |
| 2013/0301421 A1 | 11/2013 | Yi et al. |
| 2014/0029459 A1* | 1/2014 | Kwon ................... H04W 76/28 370/252 |
| 2014/0295820 A1* | 10/2014 | Kim .................. H04W 52/0225 455/418 |
| 2015/0009815 A1* | 1/2015 | Hsu ......................... H04L 47/14 370/230.1 |
| 2015/0092643 A1* | 4/2015 | Khay-Ibbat ........... H04W 76/28 370/311 |
| 2015/0201456 A1 | 7/2015 | Lee et al. |
| 2016/0143048 A1 | 5/2016 | Lee et al. |
| 2016/0157256 A1* | 6/2016 | Tseng ................ H04W 28/0278 370/329 |
| 2018/0014322 A1* | 1/2018 | Loehr ................... H04W 76/28 |
| 2021/0307108 A1* | 9/2021 | Babaei .................... H04L 5/001 |
| 2022/0007455 A1* | 1/2022 | Hong .................... H04W 76/28 |

FOREIGN PATENT DOCUMENTS

| | | |
|---|---|---|
| CN | 105103590 A | 11/2015 |
| JP | 2009533940 A | 9/2009 |
| JP | 2010508704 A | 3/2010 |
| WO | 2008114977 A1 | 9/2008 |
| WO | 2013168891 A1 | 11/2013 |
| WO | 2013169000 A1 | 11/2013 |
| WO | 2015130005 A1 | 9/2015 |

OTHER PUBLICATIONS

Office Action of Japanese Patent Office in Appl'n. No. 2019-517402, dated May 11, 2020.

ASUSTeK, "Issues on DRX Activation", 3GPP TSG-RAN WG2 #62bis, Jun. 30-Jul. 4, 2008, R2-083206.

ETSI MCC, "Report of 3GPP TSG RAN WG2 meeting #63bis, Prague, Czech Republic, Sep. 29-Oct. 3, 2008", TSG-RAN Working Group 2 meeting #64, Nov. 10-14, 2008, R2-087432.

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.231 V13.3.0, (Sep. 2016).

Wang Lihui et al. May 2013 Data Communication: Power Saving Mechanism in LTE System—Discontinuous Reception, Laboratory of Wireless Signal Processing and Network, Beijing University of Posts and Telecommunications, Beijing 100876) (7 Pages).

R2-122312: 3GPP TSG-RAN WG2 Meeting #78, Prague, Czech Republic, May 21-25, 2012, "DRX operation with different TDD UL/DL configurations," Huawei, HiSilicon, (5 Pages).

R2-122483 "DRX operation with different TDD UL/DL configurations," 3GPP TSG-RAN2 Meeting #78, Prague, Czech Republic, May 21-25, 2012, ASUSTek, Nokia Siemens Networks, Nokia Corporation, (5 Pages).

* cited by examiner

[Fig. 1]
PRIOR ART
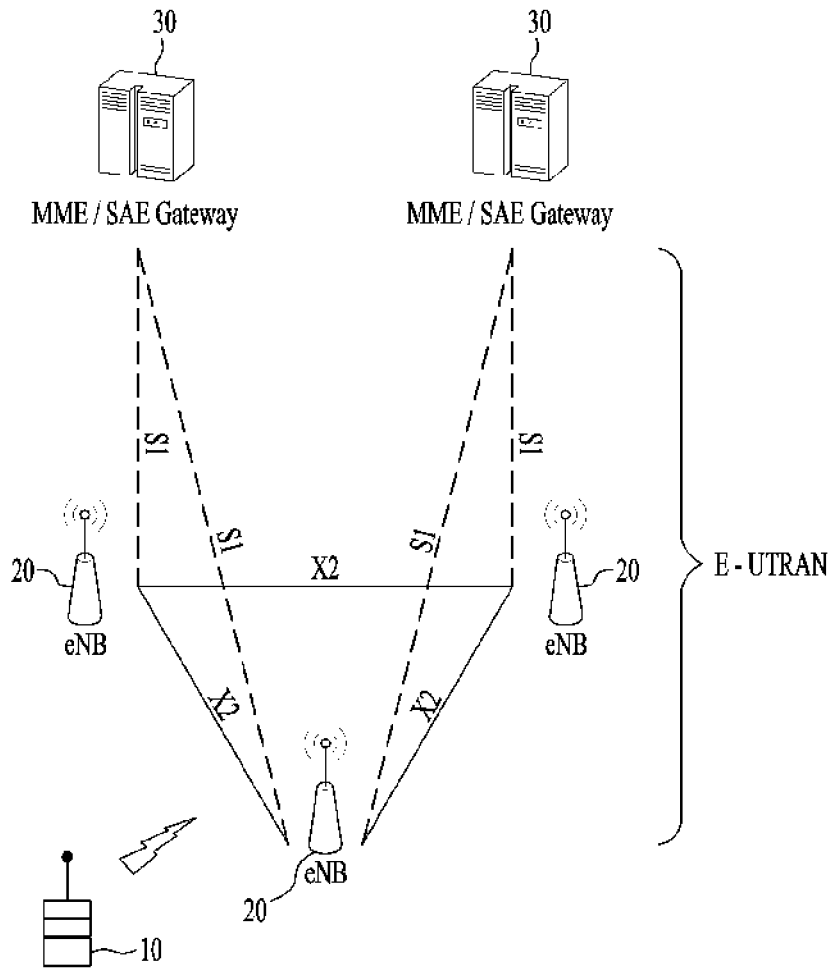
[Fig. 2]
PRIOR ART
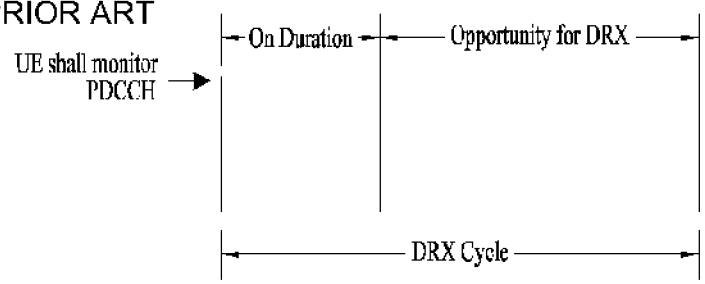

[Fig. 3]
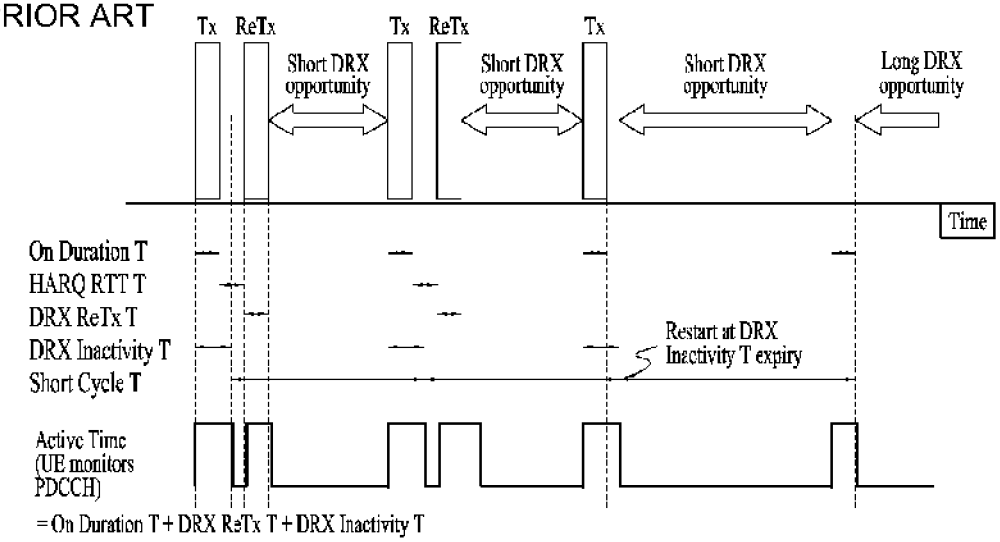
[Fig. 4]
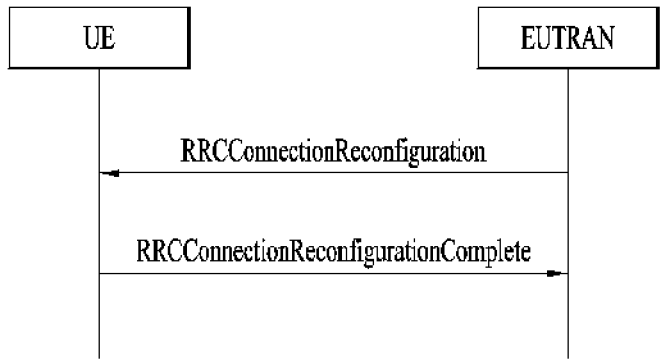
[Fig. 5]
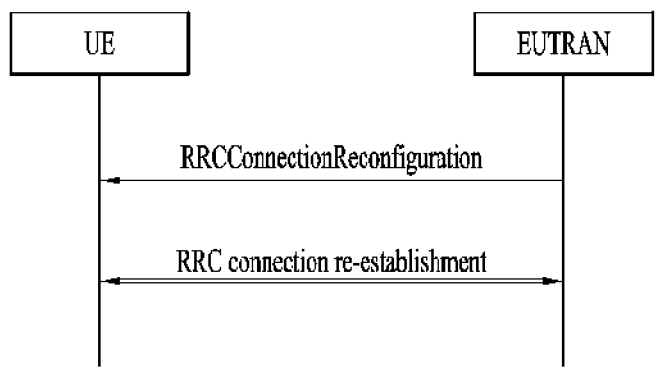

[Fig. 6]
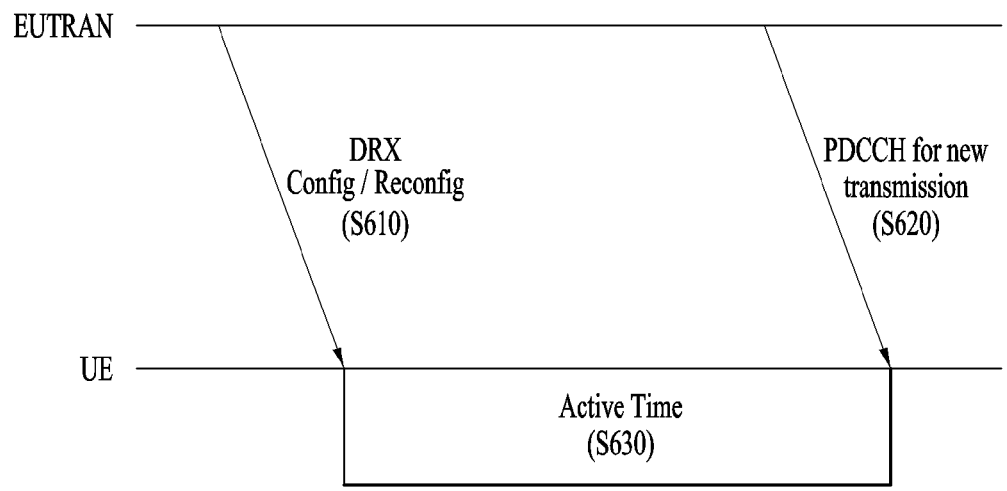
[Fig. 7]
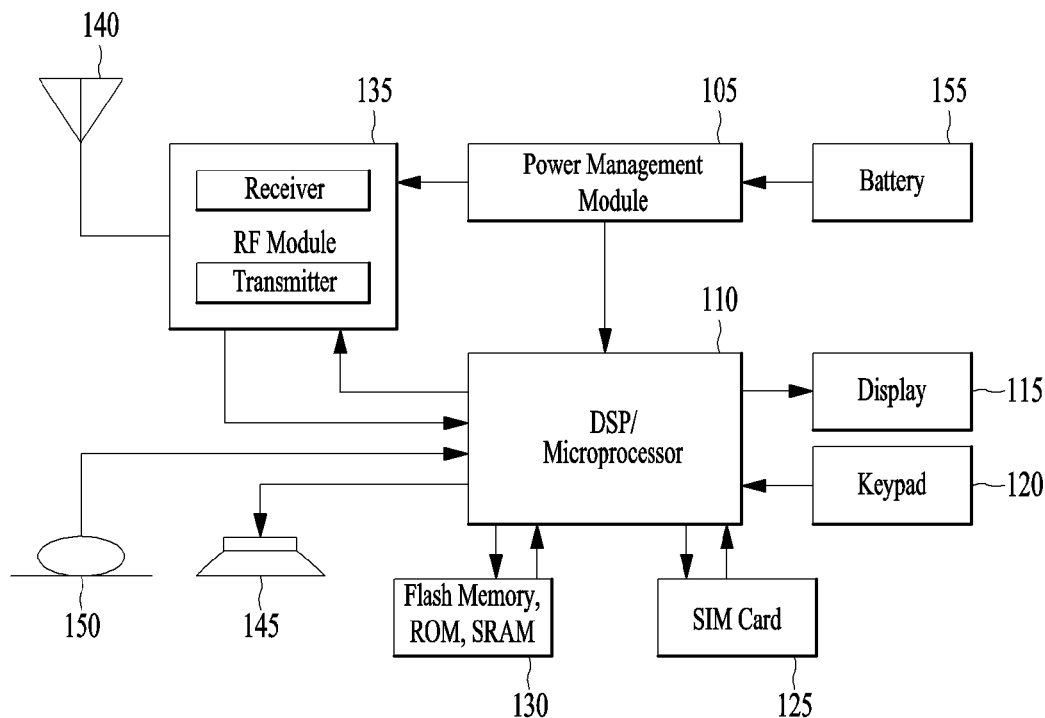

PDCCH MONITORING AFTER DRX CONFIGURATION OR RECONFIGURATION

TECHNICAL FIELD

The present invention relates to a DRX (Discontinuous Reception) operation in a wireless communication system. Specifically, the present invention is directed to PDCCH (Physical Downlink Control Channel) monitoring after receiving DRX configuration or reconfiguration message.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2 is a diagram showing a concept DRX (Discontinuous Reception).

Referring to FIG. 2, if DRX is set for a UE in RRC CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle is a repetition period of On Duration.

The UE always monitors a PDCCH during 'On Duration' in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-Inactivity-Timer or a re-transmission managing timer, drx-RetransmissionTimer as well as an On Duration managing timer, onDurationTimer is running.

The value of each of the timers is defined as the number of subframes. The number of subframes is counted until the value of a timer is reached. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

FIG. 3 is a diagram showing a method for a DRX operation in the LTE system.

Referring to FIG. 3, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

Furthermore, if the Short DRX Cycle is used and [(SFN*10)+subframe number] modulo (shortDRX-Cycle) is (drxStartOffset) modulo (shortDRX-Cycle), or if the Long DRX Cycle is used and [(SFN*10)+subframe number] modulo (longDRX-Cycle) is drxStartOffset, the UE shall start onDurationTimer.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Meanwhile, when not in Active Time, the UE does not perform a SRS (Sounding Reference Signal) transmission and a CSI reporting, which are triggered by the eNB.

For the above DRX operation, there was a discussion about when the UE starts monitoring PDCCH after receiving a message including DRX configuration or reconfiguration. As stated above, according to the current DRX operation, Active time includes following 4 cases while:

(1) onDurationTimer or drx-InactivityTimer or drx-RetransmissionTimer or drx-ULRetransmissionTimer or mac-ContentionResolutionTimer is running; or (2) a Scheduling Request is sent on PUCCH and is pending (as described in subclause 5.4.4); or (3) an uplink grant for a pending HARQ retransmission can occur and there is data in the corresponding HARQ buffer for synchronous HARQ process; or (4) a PDCCH indicating a new transmission addressed to the C-RNTI of the MAC entity has not been received after successful reception of a Random Access Response for the preamble not selected by the MAC entity.

DISCLOSURE OF INVENTION

Technical Problem

According to the DRX operation of LTE standard, DRX cycle is used only after the first expiration of the inactive timer. As stated above, the definition of Active time does not include a period until receiving PDCCH for new transmission after receiving a message including DRX configuration or reconfiguration.

Thus, there is an ambiguity whether the UE can monitor PDCCH after receiving the message including DRX configuration or reconfiguration.

Solution to Problem

To achieve the object of the present invention, in one aspect, a method for a user equipment (UE) operating based on a DRX (Discontinuous Reception) configuration, the method comprising: receiving a message including configuration or reconfiguration of DRX; and monitoring a PDCCH (Physical Downlink Control Channel) during an active time according to the configuration or reconfiguration of DRX, wherein the active time includes a first time period during a first PDCCH indicating a new transmission has not been received after receiving the message including configuration or reconfiguration of DRX, is provided.

Here, the UE can have a capability for supporting a scheduling request prohibition mechanism.

The active time may further include a second time period when a scheduling request is sent on a PUCCH (Physical Uplink Control Channel) and is pending.

The active time may include the first time period even when a scheduling request is not sent on a PUCCH (Physical Uplink Control Channel) and is not pending.

The UE may start drx-inactivity timer after receiving the first PDCCH.

The UE may not use any DRX related timer until receiving the first PDCCH, if there is no DRX configured for the UE when receiving the message.

The UE may keep using any DRX related timer until receiving the first PDCCH, if there is DRX configured for the UE when receiving the message.

According to another aspect of the present invention, a user equipment (UE) operating based on a DRX (Discontinuous Reception) configuration, the UE comprising: a transceiver configured to receive a message including configuration or reconfiguration of DRX; and a processor configured to control the transceiver to monitor a PDCCH (Physical Downlink Control Channel) during an active time according to the configuration or reconfiguration of DRX, wherein the processor controls the transceiver based on that the active time includes a first time period during a first PDCCH indicating a new transmission has not been received after receiving the message including configuration or reconfiguration of DRX, is provided.

The UE can have a capability for supporting a scheduling request prohibition mechanism.

The processor can control the transceiver based on that the active time further includes a second time period when a scheduling request is sent on a PUCCH (Physical Uplink Control Channel) and is pending.

The processor can control the transceiver based on that the active time includes the first time period even when a scheduling request is not sent on a PUCCH (Physical Uplink Control Channel) and is not pending.

The processor can start drx-inactivity timer after receiving the first PDCCH.

The processor may not use any DRX related timer until receiving the first PDCCH, if there is no DRX configured for the UE when receiving the message.

The processor may keep using any DRX related timer until receiving the first PDCCH, if there is DRX configured for the UE when receiving the message.

Advantageous Effects of Invention

According to the present invention, the ambiguity at the current standard for the case when UE receiving the message including DRX configuration or reconfiguration is clearly addressed. That is, the UE monitors the PDCCH after receiving the DRX configuration/reconfiguration message even though there is no SR pending.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a block diagram illustrating network structure of an evolved universal mobile telecommunication system (E-UMTS);

FIG. 2 is a diagram showing a concept DRX (Discontinuous Reception);

FIG. 3 is a diagram showing a method for a DRX operation in the LTE system;

FIGS. 4 and 5 show the flows when receiving the message including DRX configuration or reconfiguration;

FIG. 6 shows a concept of one embodiment of the present invention; and

FIG. 7 is a block diagram of a communication apparatus according to an embodiment of the present invention.

MODE FOR THE INVENTION

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition.

As stated above, there is an ambiguity whether the UE can monitor PDCCH after receiving the message including DRX configuration or reconfiguration.

FIGS. 4 and 5 show the flows when receiving the message including DRX configuration or reconfiguration.

The message including DRX configuration or reconfiguration can be exemplified as RRCConnectionReconfiguration message as shown in FIGS. 4 and 5.

The other purpose of these procedures includes to modify an RRC connection, e.g. to establish/modify/release RBs, to perform handover, to setup/modify/release measurements, to add/modify/release SCells. As part of the procedure, NAS dedicated information may be transferred from E-UTRAN to the UE.

As shown in FIG. 4, when the RRC Connection Reconfiguration was successful, the UE can transmit RRC Connection Reconfiguration Complete message. On the other hand, when the RRC Connection Reconfiguration was not successful, as show in FIG. 5, the UE and EUTRAN may perform RRC connection re-establishment procedure.

When discussing about when the UE starts monitoring PDCCH after receiving the message including DRX configuration or reconfiguration, those skilled in the art can believe that after the UE receives a DRX configuration, i.e., RRCConnectionReconfiguration, the UE shall monitor a PDCCH because the UE will be in Active Time due to the pending SR which was triggered in order to send RRCConnectionReconfigurationComplete in response to RRCConnectionReconfiguration.

However, one thing we need to think more with the above conclusion is that whether SR is always pending when the UE receives DRX configuration. Today, we have a couple of ways not to trigger an SR, e.g., logicalChannelSR-Mask which is introduced in Rel-9 and logicalChannelSR-ProhibitTimer in Rel-12.

As per RRC, it is understood that those SR prohibit mechanisms, i.e., logicalChannelSR-Mask and logicalChannelSR-ProhibitTimer could be used even for SRBs. Please see the following tables:

TABLE 1

SRB-ToAddMod ::= SEQUENCE {srb-Identity INTEGER (1..2),rlc-Config CHOICE {explicitValue RLC-Config,defaultValue NULL} OPTIONAL, -- Cond SetuplogicalChannelConfig CHOICE {explicitValue LogicalChannelConfig,defaultValueNULL} OPTIONAL, -- CondSetup...}

TABLE 2

ASN1STARTLogicalChannelConfig ::= SEQUENCE {ul-SpecificParameters SEQUENCE {priority INTEGER (1..16),prioritisedBitRate ENUMERATED {kBps0, kBps8, kBps16, kBps32, kBps64, kBps128,kBps256, infinity, kBps512-v1020, kBps1024-v1020,kBps2048-v1020, spare5, spare4, spare3, spare2,spare1},bucketSizeDuration ENUMERATED {ms50, ms100, ms150, ms300, ms500, ms1000, spare2,spare1},logicalChannelGroup INTEGER (0..3) OPTIONAL -- Need OR} OPTIONAL, -- Cond UL...,[[ logicalChannelSR-Mask-r9 ENUMERATED {setup} OPTIONAL -- Cond SRmask]],[[ logicalChannelSR-Prohibit-r12 BOOLEAN OPTIONAL -- Need ON]]}

Thus, there could be a case that SR prohibit mechanism is applied to SRB1 where RRCConnectionReconfigurationComplete is delivered so that SR is not pending even after the UE receives a DRX configuration.

So, if the UE is not in Active Time, the UE wouldn't start drx-InactivityTimer at all. Consequently, the UE wouldn't be able to use DRX. Therefore, it seems we need a way to make the UE in Active Time after the UE receives a DRX configuration. Therefore, it would be better to make the UE monitor the PDCCH after configuring DRX.

FIG. 6 shows a concept of one embodiment of the present invention.

As shown in FIG. 6, it is proposed that when DRX cycle is configured (S610), Active Time may explicitly include the time period from a time point when a UE receives a configuration or reconfiguration of DRX to a time point when the UE receives a PDCCH addressed by C-RNTI of the UE indicating a new transmission (S620, S630).

A UE may receive an RRC message configuring or reconfiguring a DRX from a network (S610). The RRC message can be RRCConnectionReconfiguration including DRX-config. The UE may apply the DRX configuration as indicated by the RRC message; and the UE can consider that the UE is in Active Time, i.e., the UE monitors a PDCCH (S630). I.e., the UE can start monitoring PDCCH immediately after the UE receives the RRC message configuring or reconfiguring a DRX.

Then, the UE can receive a PDCCH addressed to its C-RNTI indicating a new transmission for the UE (S620). Thereafter, the UE can start to operate DRX related timers, and further monitor PDCCH in Active Time as specified in the specification. For example, the UE starts drx-Inactivity Timer if the PDCCH indicates a new transmission in downlink/uplink/sidelink.

According to this embodiment, the definition of the Action time can be as following:

TABLE 3

The Active Time includes the time while: - onDurationTimer or drx-InactivityTimer or drx-RetransmissionTimer or drx-ULRetransmissionTimer or mac-ContentionResolutionTimer is running; or- a Scheduling Request is sent on PUCCH and is pending; or-an uplink grant for a pending HARQ retransmission can occur and there is data in the corresponding HARQ buffer for synchronous HARQ process; or- a PDCCH indicating a new transmission addressed to the C-RNTI of the MAC entity has not been received after successful reception of a Random Access Response for the preamble not selected by the MAC entity; or- a PDCCH indicating a new transmission addressed to the C-RNTI of the MAC entity has not been received after configuration or reconfiguration of DRX That is, the time period during a PDCCH indicating a new transmission has not been received after receiving the message including configuration or reconfiguration of DRX is explicitly defined as Active time for DRX operation. The UE of this embodiment is assumed as having a capability for supporting a scheduling request prohibition mechanism.

Of course, the UE can monitor the PDCCH after receiving the DRX configuration/reconfiguration message when a scheduling request is sent on PUCCH and is pending. Important point is that the active time includes the time period, during a PDCCH indicating a new transmission has not been received after receiving the message including configuration or reconfiguration of DRX, even when a scheduling request is not sent on a PUCCH (Physical Uplink Control Channel) and is not pending.

If the UE receives a RRC message configuring the DRX while there is no DRX currently configured for the UE, within the time period from a time point when a UE receives a configuration of DRX to a time point when the UE receives a PDCCH addressed by C-RNTI of the UE indicating a new transmission, the UE may not use any DRX cycle; and The UE starts to use a DRX cycle after drx-Inactivity-Timer expires; or The UE receives DRX Command MAC Control Element from the network during the Active Time.

The UE may not start any DRX related timers. The UE may start drx-InactivityTimer upon when the UE receives the PDCCH indicating a new transmission.

If the UE receives a RRC message configuring the DRX while there is a DRX currently configured for the UE, within the time period from a time point when a UE receives a configuration of DRX to a time point when the UE receives a PDCCH addressed by C-RNTI of the UE indicating a new transmission, the UE can keep using a DRX cycle currently the UE is using. The UE may keep using/running any DRX related timers currently running FIG. 7 is a block diagram of a communication apparatus according to an embodiment of the present invention.

The apparatus shown in FIG. 7 can be a user equipment (UE) and/or eNB adapted to perform the above mechanism, but it can be any apparatus for performing the same operation.

As shown in FIG. 7, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 7 may represent a UE comprising a receiver (135) configured to receive signal from the network, and a transmitter (135) configured to transmit signals to the network. These receiver and the transmitter can constitute the transceiver (135). The UE further comprises a processor (110) connected to the transceiver (135: receiver and transmitter).

Also, FIG. 7 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP system, the present invention is applicable to a variety of wireless communication systems, e.g. IEEE system, in addition to the 3GPP system.

The invention claimed is:

1. A method for a user equipment (UE) operating based on a DRX (Discontinuous Reception) configuration, the method comprising:
receiving a message including a DRX configuration or reconfiguration; and
monitoring a PDCCH (Physical Downlink Control Channel) during an active time according to the DRX configuration or reconfiguration,
wherein the active time includes a first time period during a first PDCCH indicating a new transmission by the UE has not been received after successful reception of a random access response for a preamble not selected by the UE, a second time period during a second PDCCH indicating a new transmission by the UE has not been received after receiving the message including the DRX configuration or reconfiguration, and a third time period during which a scheduling request is sent on a PUCCH (Physical Uplink Control Channel) and is pending,
wherein the UE has a capability of supporting a scheduling request prohibition mechanism as it applies to a first scheduling request in response to receiving the message including the DRX configuration or reconfiguration such that the third time period of the active time is not activated in response to receiving the message, and
wherein the UE monitors the second PDCCH during the second time period of the active time in response to the scheduling request prohibition mechanism being applied to the first scheduling request after receiving the message.

2. The method of claim 1, wherein the active time includes the second time period even when a scheduling request is not sent on a PUCCH (Physical Uplink Control Channel) and is not pending.

3. The method of claim 1, wherein the UE starts DRX-inactivity timer after receiving the second PDCCH.

4. The method of claim 3, wherein the UE doesn't use a DRX related timer before receiving the second PDCCH, based on the UE not being configured for DRX when receiving the message including the DRX configuration or reconfiguration.

5. The method of claim 3, wherein the UE uses a DRX related timer before receiving the second PDCCH, based on the UE being configured for DRX when receiving the message including the DRX configuration or reconfiguration.

6. A user equipment (UE) configured to operate based on a DRX (Discontinuous Reception) configuration, the UE comprising:
a transceiver configured to receive a message including a DRX configuration or reconfiguration; and
a processor configured to control the transceiver and to monitor a PDCCH (Physical Downlink Control Channel) during an active time according to the DRX configuration or reconfiguration,
wherein the processor further controls the transceiver based on the active time,
wherein the active time includes a first time period during a first PDCCH indicating a new transmission by the UE has not been received after successful reception of a random access response for a preamble not selected by the UE, a second time period during a second PDCCH indicating a new transmission by the UE has not been received after receiving the message including the DRX configuration or reconfiguration, and a third time period during which a scheduling request is sent on a PUCCH (Physical Uplink Control Channel) and is pending,
wherein the UE has a capability of supporting a scheduling request prohibition mechanism as it applies to a first scheduling request in response to receiving the message including the DRX configuration or reconfiguration such that the third time period of the active time is not activated in response to receiving the message, and
wherein the UE monitors the second PDCCH during the second time period of the active time in response to the scheduling request prohibition mechanism being applied to the first scheduling request after receiving the message.

7. The UE of claim 6, wherein the processor further controls the transceiver based on the active time including the second time period even when a scheduling request is not sent on a PUCCH (Physical Uplink Control Channel) and is not pending.

8. The UE of claim 6, wherein the processor starts a DRX-inactivity timer after receiving the second PDCCH.

9. The UE of claim 8, wherein the processor doesn't use a DRX related timer before receiving the second PDCCH, based on the UE not being configured for DRX when receiving the message including the DRX configuration or reconfiguration.

10. The UE of claim 8, wherein the processor uses a DRX related timer before receiving the second PDCCH, based on the UE being configured for DRX when receiving the message including the DRX configuration or reconfiguration.

* * * * *